United States Patent [19]

Timmons

[11] 3,915,477
[45] Oct. 28, 1975

[54] DUCT FITTING

[75] Inventor: David R. Timmons, Newport Beach, Calif.

[73] Assignee: Automation Industries, Inc., Los Angeles, Calif.

[22] Filed: May 3, 1974

[21] Appl. No.: 466,631

[52] U.S. Cl. .................. 285/40; 29/157 R; 29/428; 113/116 CC; 138/DIG. 2; 285/158; 285/209; 285/391
[51] Int. Cl.² .................. F16L 41/04; F16L 55/00
[58] Field of Search .......... 285/158, 159, 189, 192, 285/194, 209, 40, 423, 391, 424, 18, 47, 55, 285/114, 46; 113/116 CC; 29/526, 157 R, 428, 433; 138/DIG. 2

[56] References Cited
UNITED STATES PATENTS

| | | | |
|---|---|---|---|
| 1,000,538 | 8/1911 | Mueller | 285/158 |
| 2,799,518 | 7/1957 | Anderson et al. | 285/194 X |
| 2,930,634 | 3/1960 | Merritt | 285/423 X |
| 3,117,809 | 1/1964 | Smith | 285/423 X |
| 3,477,745 | 11/1969 | Williams et al. | 285/189 X |
| 3,596,936 | 8/1971 | Dieckmann et al. | 285/423 X |
| 3,627,615 | 12/1971 | Guiles et al. | 138/DIG. 2 |
| 3,650,551 | 3/1972 | Akers | 285/158 |

*Primary Examiner*—Werner H. Schroeder
*Assistant Examiner*—Moshe I. Cohen
*Attorney, Agent, or Firm*—Dan R. Sadler

[57] ABSTRACT

A simple and inexpensive fitting for interconnecting a flexible air conditioning and/or ventilating duct with a larger, rigid duct or plenum chamber is disclosed herein. In one embodiment, the fitting includes a main body adapted to fit inside of the flexible duct whereby one end of the fitting extends from the duct. The exposed end fits into an opening in the side wall of a rigid duct or plenum chamber whereby a flange on the end of the fitting engages the inside of the side wall to thereby secure the fitting and the flexible duct to the rigid duct or plenum chamber. The flange includes a pair of oppositely bent tabs to facilitate "screwing" the flange through the opening in the side wall. A resilient frustro-conical tensioning ring fits onto the main body of the fitting to engage the outside of the sidewall whereby the sidewall is compressed between the flange and the tensioning ring. The axial position of the tensioning ring upon the body of the fitting may be readily adjusted to accommodate walls of various thickness whereby a single fitting may be used on a wide variety of rigid ducts and/or plenum chambers. The compression of the sidewall between the flange and the tensioning ring forms a double sealing action whereby very little if any of the air flowing through the rigid duct and/or plenum chamber leads out of the fitting.

7 Claims, 13 Drawing Figures

DUCT FITTING

BACKGROUND

The installation of heating, cooling and/or air-conditioning equipment in buildings of all sizes and types requires extensive use of ducts for the distribution of air throughout the building. Historically, rigid ducts, plenum chambers, etc., have been used for this purpose. At the time a building is initially designed it is usually difficult and often not feasible to make accurate and detailed plans for the ducting. Frequently the location of the ducting is subject to change as construction proceeds and the plans for use of the interior space are laid out to meet the needs of the tenants. Historically, these and other factors have heretofore necessitated the presence of extensive tinsmith work and suitable forming and fabricating equipment situated at the building site. In addition, the operation of the forming and fabricating equipment and the installation of the ducts has required the use of highly skilled and highly paid sheet metal workers.

In order to overcome these difficulties it has been proposed to use an essentially standarized network of rigid ducts, plenum chambers, etc. This standarized network is permanently installed in the building, generally at the time the building is originally being built. In addition, a substantial number of low cost, flexible ducts are used to interconnect the rigid ducts to the various discharge or diffusion outlets scattered around inside of the building. By way of example, such a flexible duct is disclosed and claimed in co-pending application Ser. No. 291,649, and entitled Insulated Flexible Duct Filed: Sept. 25, 1973, in the name of Marvin Alfred Koerber and assigned of record to Automation Industries, Inc.

The end of the flexible duct is normally interconnected with the rigid duct by means of a fitting which is mounted in an opening in a sidewall of the rigid duct. Various types of sheet metal fittings have been proposed for this purpose. In order to be economically useful, it is essential that the fitting be inexpensive to manufacture and very simple to install in as little time as possible. It is also essential the fitting be as versatile as possible whereby it may be used on any type of rigid duct and/or plenum chamber. If the fitting is expensive, requires a large amount of time, skill or equipment to install, leaks air after it is installed and/or requires a large inventory of fittings to accommodate the various ducts normally employed, then the installed cost of the flexible duct becomes excessive and/or its performance is inadequate. None of the sheet metal fittings available heretofore have fully satisfied all of these requirements.

SUMMARY

The present invention provides means for overcoming the foregoing difficulties. More particularly, it provides a sheet metal fitting which is low in cost, simple and easy to use for interconnecting a flexible duct to a rigid duct or plenum chamber, etc., at an opening in a sidewall of the duct or chamber.

More particularly, the present invention provides a fitting having a main body adapted to fit inside the end of a flexible duct and be secured thereto. The exposed end of the fitting includes fastening or retaining means such as a radially outwardly directed flange which is adapted to pass through the opening and engage the inside surface of the sidewall. Second fastening or retaining means such as a frustro-conical tensioning ring is provided on the outside of the body to engage the outside surface of the sidewall. The flange and the tensioning ring compress the sidewall therebetween so as to securely and rigidly mount the fitting on the rigid duct or plenum chamber and to form a double air seal with the sidewall.

The tensioning ring is a frustro-conical member which is adjustable on the body of the fitting whereby it can be positioned to accommodate a wall of any desired thickness. This, plus the fact that many of the parts can be interchangably used for different purposes, sizes and configurations, permits a minimum inventory of parts to be used to assemble a maximum variety of fittings for a maximum variety of ducts. In addition, the parts are all fabricated from sheet metal and have single shapes whereby the tooling and the assembly operations are extremely inexpensive.

DESCRIPTION

Figure 1:
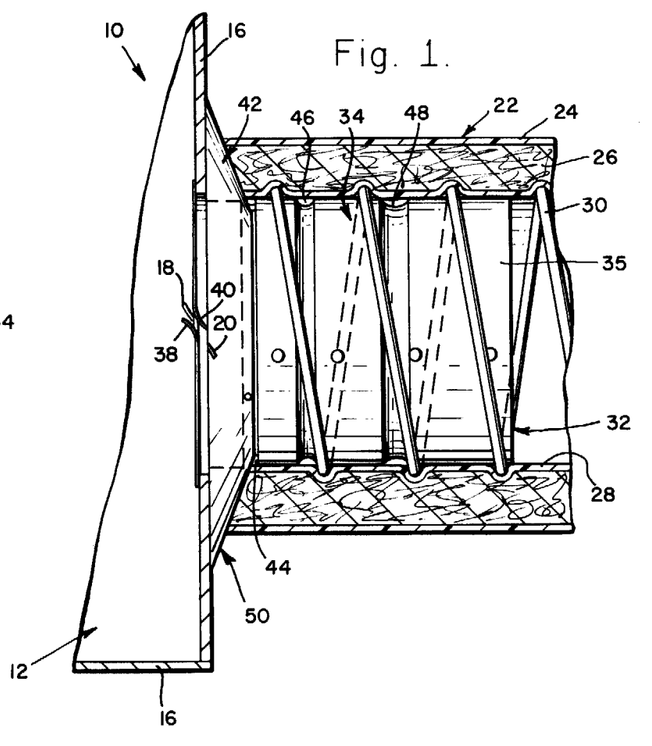
FIG. 1 is a side view of a fitting embodying one form of the present invention, said fitting being shown as assembled for and installed on a thin-walled rigid duct or plenum chamber.
Figure 2:
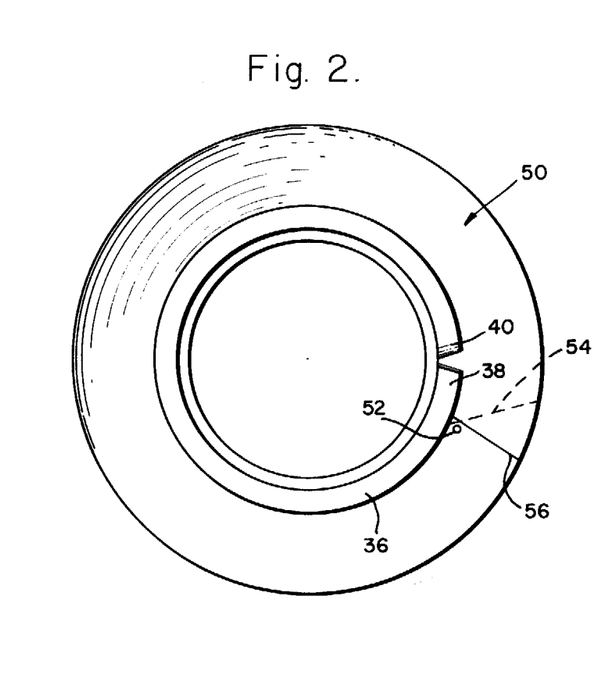
FIG. 2 is an end view of the embodiment of FIG. 1.

Referring now to the drawings, and more particularly to FIGS. 1 and 2, there is shown a fitting 32 embodying one form of the present invention. The fitting 32 is particularly adapted to interconnect a flexible duct 22 with a rigid duct or plenum chamber 12. This rigid duct 12 is normally permanently installed in the building at the time it is constructed. The duct 12 is connected to the central air conditioning, heating and/or ventilating system. It is effective to carry the air throughout the building into the various zones or regions. This duct 12 may be used in either a high velocity or low velocity system and/or in a high pressure or low pressure system.

The rigid duct 12 may be of any desired construction suitable for the particular type of system being used. By way of example, in the present instance the duct is formed from sheet metal and has a plurality of planar sidewalls 16. The sidewalls 16 have a thickness corresponding to the thickness of the sheet metal used to fabricate the rigid duct 12. As a consequence, the thickness of the sidewall is very thin, for example about 0.050 inches more or less.

The second duct 22, which is to be connected to the rigid duct 12 may be of any desired variety. However, it is contemplated the duct 22 will be of a flexible variety similar to that disclosed and claimed in co-pening application Ser. No. 291,649 filed Sept. 25, 1973 in the name of Marvin A. Koerber entitled Insulated Flexible Duct and assigned of record to Automation Industries, Inc.

The skeleton or background of the flexible duct 22 is normally a spiral spring 30. This spring 30 may be a plastic material but normally it is a metal wire that is wound into a helical configuration. The wire is usually of sufficient strength to prevent its being radially crushed. However, it is usually fairly readily axially stretched and compressed and can be bent into any desired configuration.

A layer 26 of insulating material is formed around the spring. This insulating material may be of any desired material such as a resilient foamed plastic, etc. However, it is normally one of more layers of fiberglass matling or similar material. The insulating layer 26 may be laid directly onto the spring 30 and it may or may not be bonded to the spring 30. In the present invention, a liner 28 is provided between the insulation 26 and the spring 30. This liner may be an imperforate plastic sheet wrapped around the spring 30. Alternatively, it may be a so called "scrim cloth", such a cloth is a loosely woven fabric having by way of example about 10 threads to the inch.

An outer cover or vapor barrier 24 is provided around the insulating layer 26. This barrier 24 may be a thin layer such as a vinyl film. A reinforcing woven fiber mesh may be added to the film to increase its strength, prevent its ripping and tearing, etc. This vapor barrier 24 is a moisture tight, air tight cover which prevents the loss of air from the duct, the absorption of moisture, etc.

It can thus be seen that the duct 22 is a lightweight, insulated, flexible duct which may be used in high or low velocity air conditioning, heating and/or ventilating systems. Such a duct may be used as a connector in place of a length or section of field-insulated rigid duct.

The fitting 32, as best seen in FIG. 1, includes a main body 34. The body 34 includes a generally cylindrical portion 35 of relatively uniform diameter throughout. The body 34 may be formed by rolling a flat sheet metal stock into a cylindrical configuration and fastening the overlapping edges together by rivets, etc. The outside diameter of the body 34 is approximately equal to or slightly less than the inside. As a consequence, the duct 22 fits over the outside of the body 34 in a relatively close-fitting relationship.

A flange 36 is secured to the end of the body 34. The flange 36 is normally formed by a separate member having a cylindrical barrel. The barrel fits inside of the body and is secured in position thereon by means of a rivet, etc. This flange 36 projects radially outwardly from the body by some predetermined distance. This distance is not believed to be critical. It is usually just big enough to lodge against the inside surface of the sidewall 16 and retain the fitting 32 in position on the rigid duct 12.

Referring now to the drawings, and more particularly to FIG. 1, there is shown a duct assembly 10 in accordance with the present invention. Assembly 10 includes a duct 12 which may be a branch-out duct connected in a fluid-tight manner to a main air duct (not shown). This duct 12 may be relatively thin-walled as in the case of ducts made from sheet metal.

A second duct 22, which may be a flexible duct, is adapted to be connected in fluid-tight engagement to duct 12. This connection is provided by fitting means 32 which is adapted to be connected to both duct 12 and duct 22 in a fluid-tight manner while permitting air flow therebetween.

Thus, referring to duct 12, an opening 14 may be formed in the wall 16 of duct 12 on which fitting 32 is to be installed. This opening 14 may have been previously formed in wall 16 or may be cut therein in any suitable manner, such as by tin shears at a tinsmith shop, and may be round as is well-known in the art. A pair of oppositely bent spaced tabs 18, 20 may be formed on the peripheral edge forming opening 14 also as is well-known in the art. These tabs 18, 20 extend in opposite directions, one toward opening 14 and the other outwardly thereof.

Although any suitable duct may be connected to duct 12, as particularly contemplated within the present invention, duct 22 may be a flexible duct and may include a generally cylindrical outer cover 24 which may form a vapor barrier for fluids passing therethrough. Thus, cover 24 may be a vinyl film reinforced with woven fiber mesh so as to be flame-proof and moisture-tight. Cover 24 is bonded to or otherwise encloses an inner, generally cylindrical, insulating member 26 which may be of fiberglass. Member 26 encloses and may be bonded to an inner generally cylindrical reinforcing member 28 which may be of vinyl-coated fiberglass high-strength mesh or the like. This member 28 is permanently bonded to a helically extending wire 30 having an inner diameter related to fitting 32 as will be discussed shortly. Wire 30 may be of vinyl-coated spring steel to prevent corrosion.

Thus, duct 22 is preferably a lightweight insulated flexible duct which may be used in high or low velocity air conditioning systems. Such a duct may be used as a connector in place of a length or section of field-insulated rigid duct. The inner mesh sleeve or reinforcing member 28 prevents erosion of the insulating member 26 while providing strength and stability. The reinforced vapor barrier cover 24 resists damage or puncture and will not balloon under pressure.

Referring now to fitting means 32, such fitting means, in a first embodiment of the invention, includes a generally cylindrical main body portion 34 of relatively uniform diameter throughout. The outer diameter thereof is related to the inner diameter of helical wire 30 so that duct 22 slightly fits over body portion 34 in a relatively close-fitting relationship.

Fitting means 32 includes a flange 36 fixedly secured to the forward end thereof. This flange 36 is provided with a pair of oppositely bent tabs 38, 40 (see FIG. 2), similar to tabs 18, 20, so that flange 36 may be threaded into opening 14. That is, by holding fitting means 32 in registry with opening 14 with flange tabs 38, 40 aligned with opening tabs 18, 20, rotation of fitting means 32 about its own axis serves to advance the edge of opening 14 along the portion of fitting means 32 rearwardly of flange 36 until flange 36 is disposed internally of opening 14 as shown in FIG. 1.

As particularly contemplated within the present invention, the fitting means 32 includes means for tensioning fitting means 32 against duct 12. In the exemplary embodiment, such tensioning means, indicated generally at 42, includes at least a pair of annular grooves or recesses, such as grooves 44, 46 and 48, formed on main body portion 34. Prior to rotation of flange 36 into opening 14, a tensioning collar or ring 50 is provided on fitting means 32. Such ring 50 may be formed by loosely riveting together the free ends of a split annular band of metal or the like, as, for example, shown in FIG. 2 wherein a rivet 52 is shown loosely joining together the free ends 54, 56 of tensioning ring 50.

When fitting means 32 is used on a duct having a relatively thin wall, such as wall 16 of duct 12 in FIG. 1, the tensioning ring 50 is bent into a conical shape — the loosely joined connection allowing ring 50 to be bent into this configuration and making its inside diameter larger — and slid over the rear end of main body portion 34 until it snap-fits into the first annular groove 44. This may be carried out prior to rotating flange 36 through opening 14. When flange 36 is so rotated as discussed hereinabove, the tensioning ring 50 is forced against the wall 16 of duct 12 surrounding opening 14. This results in the tensioning ring 50 and flange 36 deflecting wall 16 slightly which both rigidly securely retains fitting means 32 in position and forms a double air-tight seal between the flange 36 and duct 12 and the tensioning ring 50 and duct 12.

A second duct, as for example, aforementioned flexible duct 22, may now be connected to fitting means 32 by sliding duct 22 over main body portion 34 as shown in FIG. 1. Helical wire 30 embraces main body portion 34 in a close-fit relationship.

Figures 3, 4:
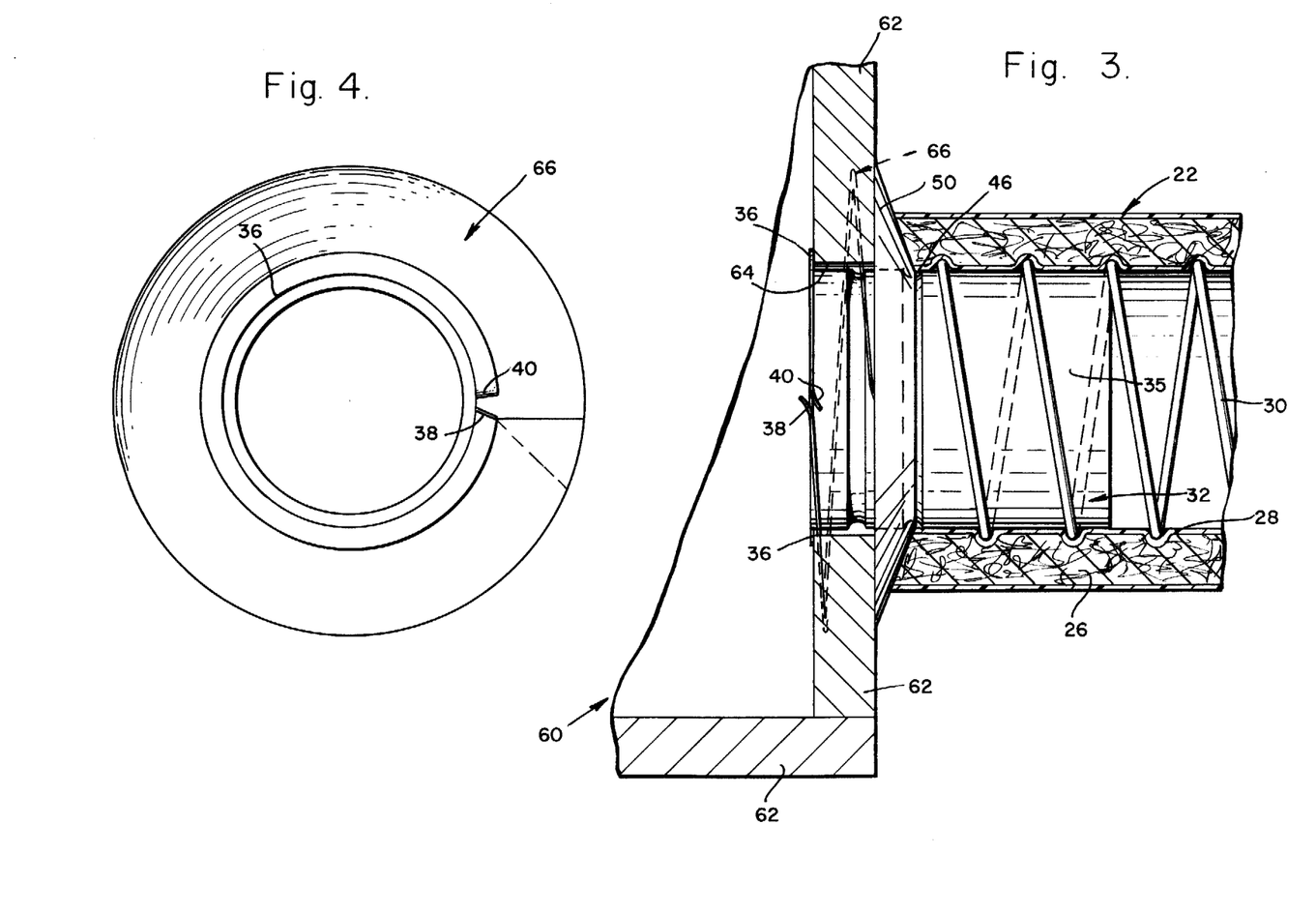
FIG. 3 is a side view similar to FIG. 1, but showing the fitting assembled for and installed on a thick-walled duct.
FIG. 4 is an end view of the installation of FIG. 3.

If fitting means 32 is to be connected to a thick-walled duct, as for example, a distribution duct made of duct-board, tensioning ring 50 is placed in the second groove 46 as shown in FIG. 3 wherein like numerals refer to like parts of the assembly 10 of FIGS. 1 and 2.

Thus, in the assembly shown in FIG. 3, a duct 60 is shown having a relatively thick front wall 62 with opening 64 formed therein. Duct 60 may, as discussed hereinabove, be made of duct-board, as for example, a semi-resilient fiberglass mat having kraft papers bonded on the surfaces thereof.

In addition to placing ring 50 in second groove 46 (groove 48 having been omitted for convenience of illustration in FIG. 3), as particularly contemplated within the present invention, self-threading means may be provided for self-threading fitting means 32 into duct 60. In the exemplary embodiment, such self-threading means includes a helically extending annular self-threading member 66 which is attached at one end to flange 36 adjacent tabs 38, 40 with the other end remaining free to form a screw thread. Member 66 may be a relatively thin sheet of metal similar to ring 50. Thus, member 66 cuts into and thus screws its way through the fibers in duct 60 when flange 36 is threaded into opening 64. Opening 64 is slightly greater in diameter than the outer diameter of main body portion 34 to carry out the foregoing.

Figure 5:
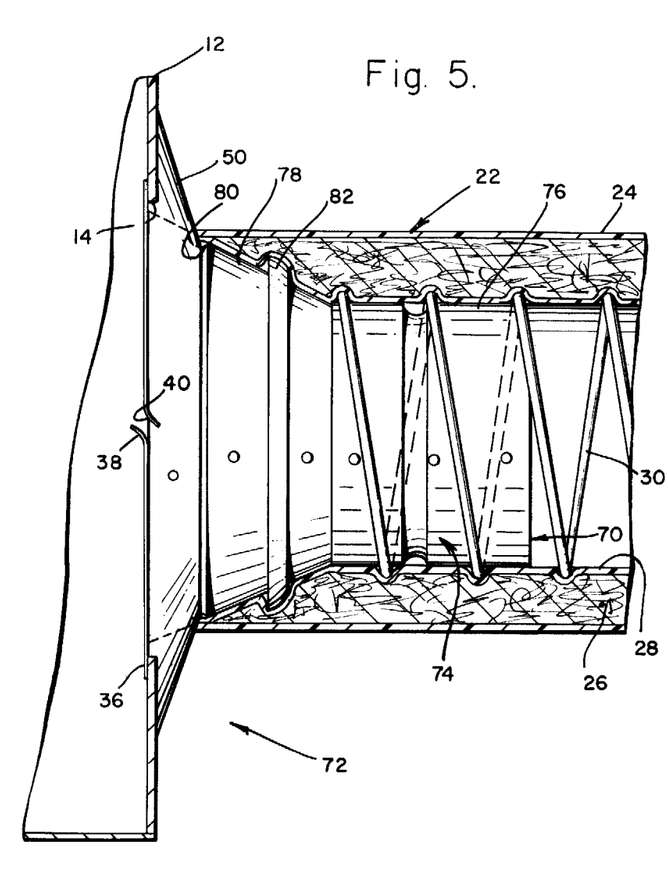
FIG. 5 is a side view of a second fitting embodying a modified form of the present invention, said fitting being shown as assembled for and installed on a thin-walled duct.
Figure 6:
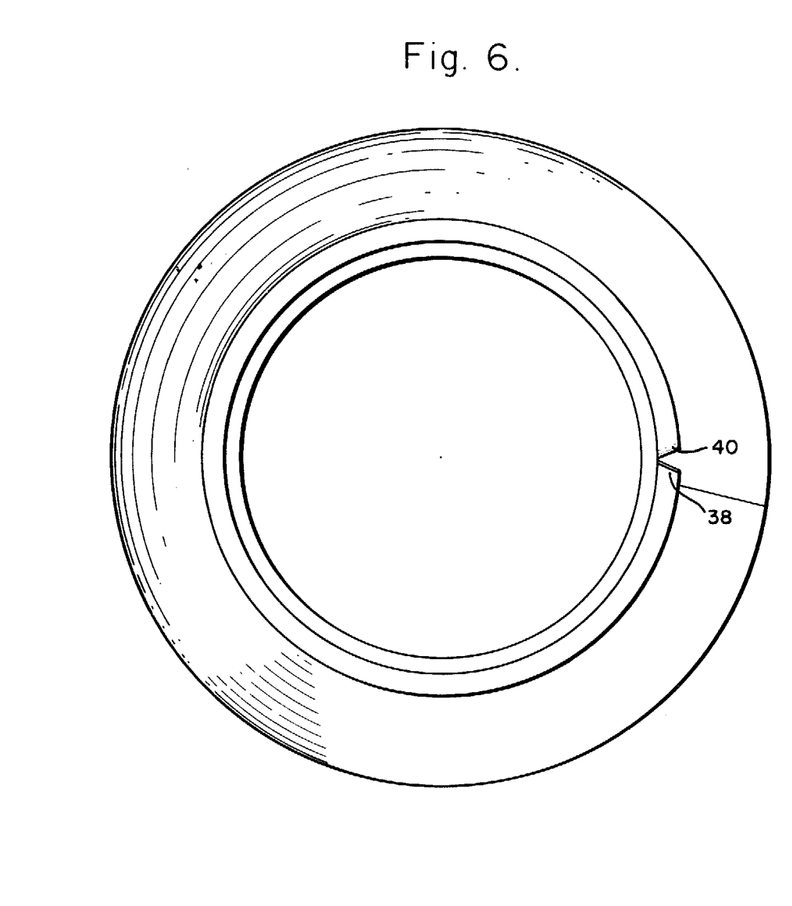
FIG. 6 is an end view of the installation of FIG. 5.

Referring now to FIGS. 5 and 6, a second embodiment of the invention is shown. In this embodiment, fitting means 70 is adapted to be used in duct assembly 72. Again, like numerals may refer to like parts of FIGS. 1 through 4. Thus, rigid duct 12 may be the same as the thin-walled duct of FIG. 1 with opening 14 formed therein. The fitting means 70 includes a main body portion 74 comprised of a first generally cylindrical portion 76 of generally uniform diameter throughout and an integral conically-shaped portion 78 at its forward end. A first annular recess or groove 80 is formed in conically-shaped portion 78 and corresponds to groove 44 in the FIG. 1 embodiment. However, instead of a second annular groove, as particularly contemplated within the present invention, retaining means are provided on portion 78 for retaining ring 50 in position when fitting means 70 is to be used to connect to a thick-walled duct as will be discussed shortly. Thus, in the exemplary embodiment, retaining means in the form of an annular bead or land 82 is provided on conical portion 78 rearwardly of groove 80 (second groove 46 having been replaced by land 82).

When fitting means 70 is to be used with a thin-walled duct, as for example, duct 12, tensioning ring 50 is disposed in groove 80 on conical portion 78 and tensioning ring 50 abuts against wall 16 as discussed hereinabove when flange 36 is threaded through opening 14.

Figure 7:
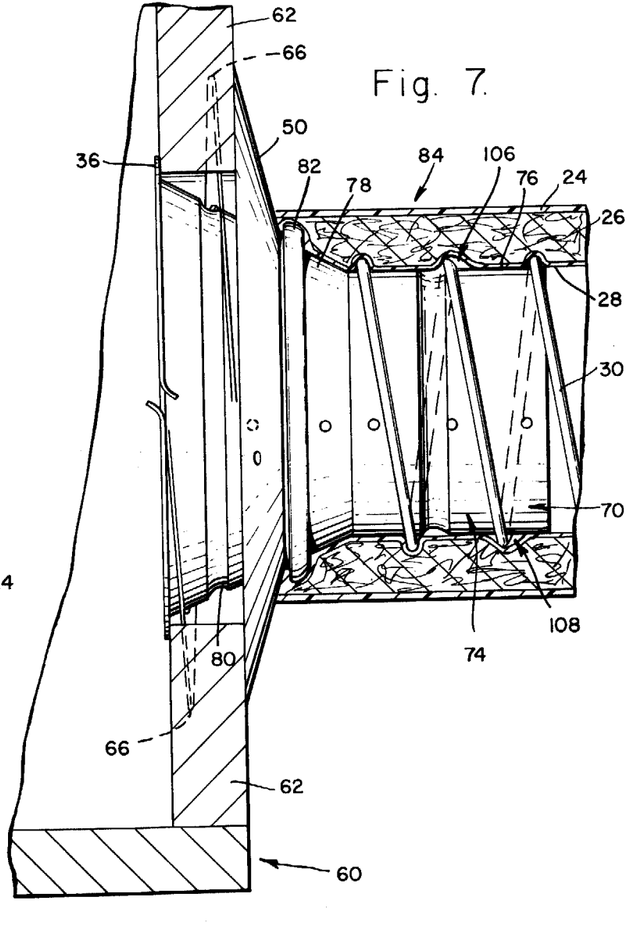
FIG. 7 is a cross-sectional view of the fitting of FIGS. 5 and 6 installed in fluid-tight engagement with a thick-walled duct.

Referring now to FIG. 7 where like numerals once again refer to like parts of FIGS. 5 and 6, a duct assembly 84 is shown for connecting fitting means 70 to a thick-walled duct 60 similar to the duct 60 of FIG. 3. Self-threading member 66 is once again connected to flange 36 and bites or self-threads into the fibers of wall 62 when flange 36 is threaded therethrough. In this embodiment, tensioning ring 50 is retained in position by abutment against land 82 and the widest portion of ring 50 abuts against wall 62 as discussed hereinabove.

It can be seen from the foregoing that a relatively small number of components may be used to arrange the fitting means 32 and 70 for installation on a wide variety of ducts. The third groove 48 may be used in the case of even thicker-walled ducts. The single cylindrical fitting means of FIGS. 1 through 4 may be used on all types of ducts. The tensioning ring 50 is merely placed in the proper groove 44 or 46 depending on the thickness of the duct wall. The conical fitting of FIGS. 5 through 7 may be used on a wide variety of ducts by merely placing the tensioning ring 50 in either groove 80 or abutting against land 82.

As discussed hereinabove, these fittings are intended primarily to connect a flexible duct, such as an air conditioning duct, to a rigid duct, such as a distribution duct. The flexible duct 22 disclosed herein may be used or some similar duct.

Figure 12:
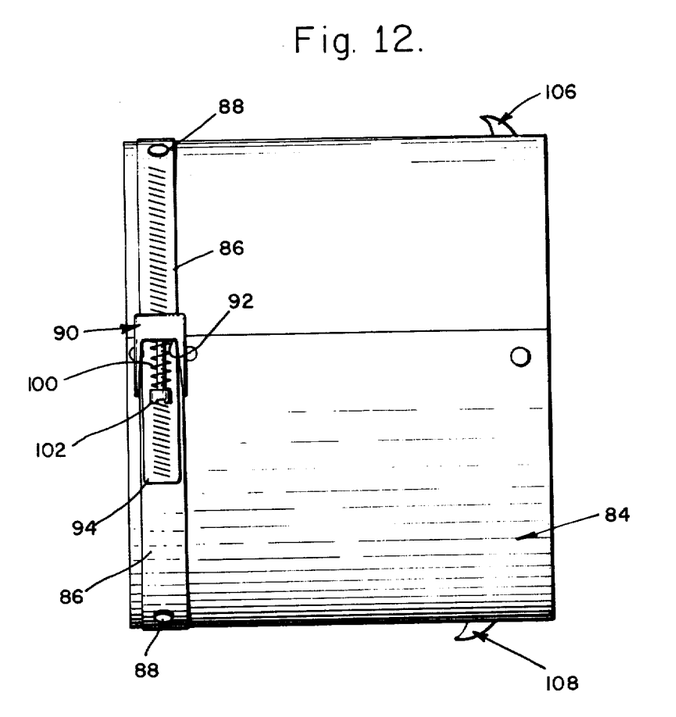
FIG. 12 is a view of a fitting embodying another form of the invention.
Figure 13:
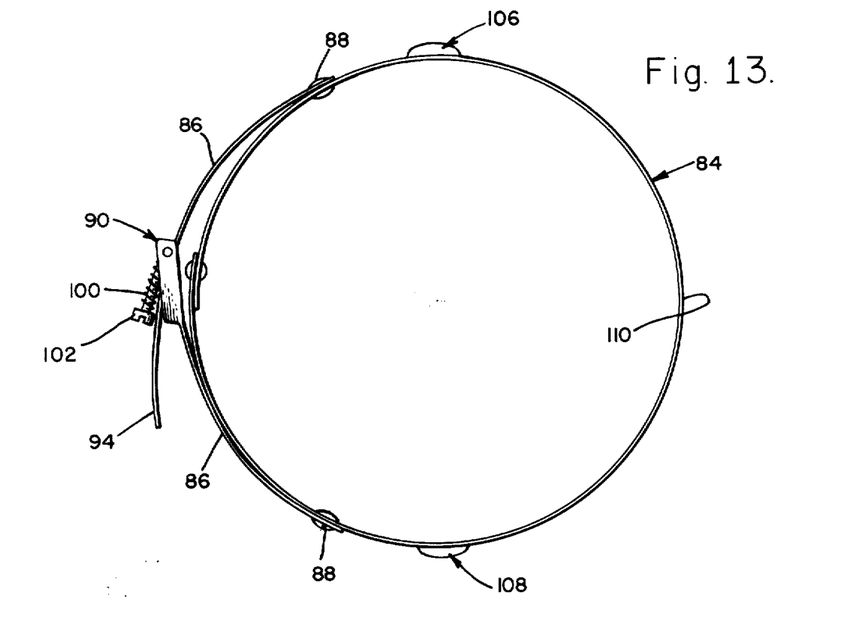
FIG. 13 is an end view of the fitting of FIG. 12.

The fitting of FIGS. 1 through 7 may include some form of spring retaining means for clamping the flexible duct 22 to the fitting in a manner preventing axial movement of the duct 22 off of the fitting. Thus, as particularly contemplated in the present invention and shown in FIG. 7, spring retaining means may be provided on the fittings of FIGS. 1 through 7 for retaining the duct 22 in position thereon. The retaining means may be in the form of retainers or detents formed directly on the main body portion of the fitting means itself, which body portion may be sheet metal wrapped into a cylinder and secured together in any suitable manner as by rivets. Thus, in the exemplary embodiment, a plurality of detents or retainers 106, 108 are formed directly on the cylindrical portion 76 of the main body portion 74 of fitting means 70 (of course, these retainers 106, 108 may also be formed directly on the fitting means of FIGS. 1 through 6). These retainers or detents 106, 108 are helically spaced and related to the helical turns of wire 30 as will be explained more fully with respect to FIGS. 8 through 13. Thus, as an alternative to forming the retaining means directly on the fitting means, as shown in FIGS. 12 and 13, such retaining means may be in the form of a separate annular split-ring fitting 84 having an annular tightening strap 86, i.e. secured thereto as by means of a plurality of rivets 88 or the like. On end of strap 86 carries a buckle 90 having an opening or slot 92 therein through which the free end 94 of strap 86 extends. A threaded aperture is provided in buckle 90 and a bolt is threaded therein. A helical spring 100 encircles the bolt between buckle 90 and the slotted head 102 of the bolt. The outer peripheral surface of strap 86 may be roughened and the bolt is adapted to abut against the outer peripheral surface to thereby retain end 94 in fixed position in buckle 90 and thus tighten band 84.

A plurality of detents or retainers 106, 108 identical to the retainers of FIG. 7 are provided on the outer peripheral surface 110 of band 84, two such retainers being shown. Thus, further comments directed to the configuration of the retainers of FIGS. 12 and 13 and their function are also applicable to the retainers of FIGS 7, 8 and 11. As can be seen more particularly in FIGS. 10 and 11, these retainers 106, 108 are generally cup-shaped and merge smoothly and upwardly from surface 110 of band 84 to form a lip, then merge inwardly toward surface 110 to form a hook portion 114. Further, as discussed hereinabove with respect to FIG. 7 and also as shown in FIG. 12, retainers 106, 108 are helically spaced on surface 110 in a spacing generally related to the spacing between turns of the helical wire 30.

Figures 8, 9, 10, 11:
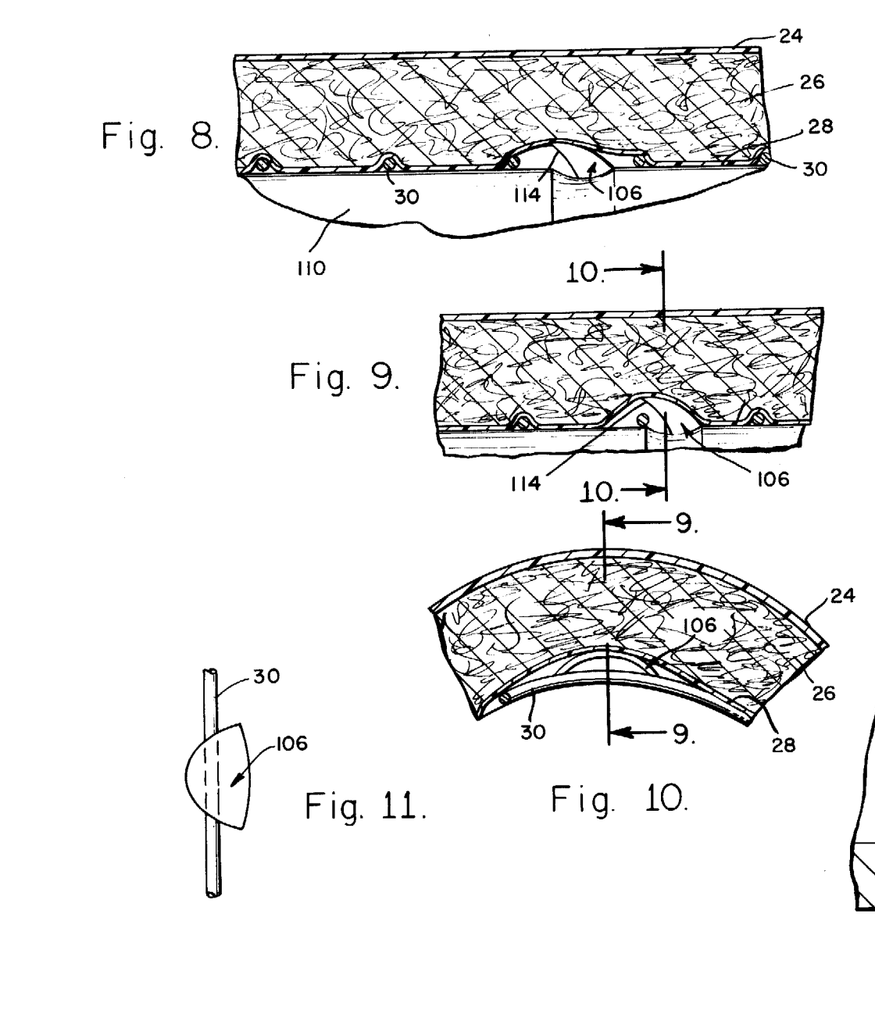
FIG. 8 is a fragmentary cross-sectional view, on a large scale of a portion of the fitting of FIG. 7, showing a portion of a flexible duct in a position while it is being installed on the fitting.
FIG. 9 is a fragmentary view similar to FIG. 8 but showing the flexible duct in position after it has been installed thereon.
FIG. 10 is a fragmentary cross-sectional view taken substantially along the plane of line 10—10 in FIG. 9.
FIG. 11 is a plan view of a portion of the elements of the retaining means of FIG. 7.

Referring once again to FIG. 7 and with particular reference to FIGS. 8 and 9, when duct 22 is inserted onto main body portion 74, the smooth curvature of retainers 106, 108 permits the helical wire 30 to slide over retainers 106, 108 as shown in FIG. 8. If duct 22 is pulled axially away from fitting means 70, the helical turns of wire 30 adjacent retainers 106, 108 move into engagement with the hook portions 114 of retainers 106, 108 as shown in FIG. 9. The final position of wire 30 with respect to retainers 106, 108 is shown in FIG. 7. FIG. 8, in addition, shows how the cup-shaped configuration of retainers 106, 108 serves to prevent further axial movement of wire 30 past retainers 106, 108.

It can be seen that these retainers or detents 106, 108 are small, round protuberances that may be formed or otherwise provided on either the fitting means itself or on the outer peripheral surface 110 of band 84 in any suitable manner, such as by upsetting or punching a rounded tab outwardly from either fitting 84 or from the main body portion of the particular fitting means. This forms a smooth, round surface that slides smoothly on the inner reinforcing member 28 and wire 30. It also reacts with spring 30 to form a threaded or screw action. Once the flexible duct 22 has been threaded onto the particular fitting means, the duct 22 may be pulled slightly in an axial direction away from the fitting means. This causes the sharp edge or lip of the retainer 106, 108 to lodge between the wire 30 and reinforcing member 28 to securely anchor the flexible duct 22 to its fitting.

As discussed hereinabove, although these retainers or detents may be formed directly on the fitting itself as illustrated in FIG. 7, a separate fitting such as fitting 84 of FIGS. 12 and 13 may be provided, which fitting 84 may be secured, via bolt 98 and strap 86 as heretofore described, to one end of a flexible duct, such as duct 22, then clamped onto a rigid fitting already installed on a distribution duct, as for example, a fitting connected in any suitable manner to a duct similar to ducts 12 and 60.

It is to be understood that suitable changes and modifications may be provided for carrying out the foregoing method and means of connecting one duct to another. It will be apparent to those having skill in the art that variations and modifications of the various embodiments and methods herein disclosed may be made without departing from the scope of the invention.

Having thus described the invention, what is claimed is:

1. A flow control assembly comprising:
 a duct having an opening therein having a pair of spaced tabs formed on the peripheral edge of said opening, one of said tabs extending inwardly of said opening and the other of said tabs extending outwardly of said opening;
 a fitting having a main body portion with a forward end and a rearward end,
 a flange on said main body portion encircling the forward end and projecting radially outwardly therefrom, said flange having a pair of tabs formed on the leading edge thereof, one of said flange tabs extending in a direction toward the main body portion and the other of said flange tabs extending in a direction away from said main body portion, a helically extending self-threading member being connected at one end to said flange adjacent said flange tabs, the outermost edges thereof being generally sharp, said flange being threadably mounted in the opening in said branch-out duct in a fluid-tight manner, said flange being disposed internally of said duct and said self-threading member cutting into said branch-out duct surrounding said opening, at least one abutment member formed in said main body portion rearwardly of said flange and spaced therefrom and a generally conically-shaped resilient tensioning ring encircling said main body portion abutting against said abutment member and projecting radially outwardly therefrom, the narrowest portion of said conically-shaped ring being disposed against said abutment member with the widest portion thereof extending in a direction outwardly from the narrowest portion thereof away from said main body portion and abutting against said branch-out duct surrounding said opening; and
 a flexible duct fixedly secured to said main body portion.

2. A fitting for connecting a first duct to a second duct wherein one of said ducts includes a front wall having an opening therein, said fitting comprising:
 a main body portion having a forward end and a rearward end;

a flange encircling the forward end of said main body portion and fixedly secured thereto and projecting radially outwardly therefrom;

at least one abutment member formed on said main body portion rearwardly of said flange and spaced therefrom;

generally conically shaped resilient tensioning means removably disposed on said main body portion abutting against said abutment member and projecting radially outwardly therefrom, the narrowest portion of said tensioning means abutting against said abutment member and retained in fixed position on said main body portion with the widest portion thereof extending in a direction away from said main body portion and toward said flange, said tensioning means being adapted to be forced against the wall of said one of said ducts when said flange is inserted into said opening therein to thereby rigidly secure said main body portion to said one of said ducts and form a double seal between both said flange and said one of said ducts and the tensioning means and said one of said ducts, said main body portion includes a first portion having a forward end and a rearward end, said first portion being generally cylindrical in cross-section and of generally uniform diameter throughout substantially its entire length, a second portion integral with the forward end of said first portion, said second portion being generally conical in shape and having its widest portion at the forward end of said main body portion, said abutment member is disposed on said second portion and a raised annular bead encircles the second portion of said main body portion spaced rearwardly of said abutment member, spring retaining means disposed on said main body portion for preventing axial movement of a helical spring on the other one of said ducts and inserted over said main body portion in a direction away from said tensioning means, and said spring retaining means includes a plurality of spaced detents intergral with said main body portion extending outwardly therefrom, said detents being helically spaced on said main body portion and generally cup-shaped and curved outwardly and upwardly from a first point on said main body portion and in a direction away from the rear end of said main body portion.

3. A fitting for connecting a first duct to a second duct wherein one of said ducts includes a front wall having an opening therein, said fitting comprising:

a main body portion having a forward end and a rearward end;

a flange encircling the forward end of said main body portion and fixedly secured thereto and projecting radially outwardly therefrom;

at least one abutment member formed on said main body portion rearwardly of said flange and spaced therefrom;

generally conically shaped resilient tensioning means removably disposed on said main body portion abutting against said abutment member and projecting radially outwardly therefrom, the narrowest portion of said tensioning means abutting against said abutment member and retained in fixed position on said main body portion with the widest portion thereof extending in a direction away from said main body portion and toward said flange, said tensioning means being adapted to be forced against the wall of said one of said ducts when said flange is inserted into said opening therein to thereby rigidly secure said main body portion to said one of said ducts and form a double seal between both said flange and said one of said ducts and the tensioning means and said one of said ducts, said main body portion includes a first portion having a forward end and a rearward end, said first portion being generally cylindrical in cross-section and of generally uniform diameter throughout substantially its entire length;

a second portion integral with the forward end of said first portion, said second portion being generally conical in shape and having its widest portion at the forward end of said main body portion, said abutment member is disposed on said second portion and a raised annular bead encircles the second portion of said main body portion spaced rearwardly of said groove, spring retaining means disposed on said main body portion for preventing axial movement of a helical spring on the other of said ducts and inserted over said main body portion in a direction away from said tensioning means, and said spring retaining means including a retaining member removably secured to said main body portion, said retaining member having a plurality of spaced detents extending outwardly therefrom, said detents being helically spaced on said retaining member.

4. A flow control assembly comprising:

a duct having a front wall with an opening therein, a fitting having a main body portion with a forward end and a rearward end, said fitting having a flange encircling the forward end of said main body portion and projecting radially outwardly therefrom, said flange being insertable into the opening in said branch-out duct in a fluid-tight manner with said flange being disposed internally of said opening, at least one abutment member disposed on said main body portion rearwardly of said flange and spaced therefrom, and generally conically-shaped resilient tensioning means removably encircling said main body portion abutting against said abutment member and retained in fixed position on said main body portion and projecting radially outwardly therefrom, the narrowest portion of said conically-shaped tensioning means being disposed against said abutment member with the widest portion thereof extending in a direction outwardly from the narrowest portion away from said main body portion and abutting against said branch-out duct surrounding said opening;

a flexible duct fixedly secured to said main body portion, said flexible duct includes a helical spring encircling a substantial portion of said main body portion, a generally cylindrical reinforcing liner encircling said wire, and a generally cylindrical vapor barrier cover encircling said insulating liner, and spring retaining means disposed on said main body portion for preventing axial movement of said helical spring, inserted over said main body portion in a direction away from said tensioning means, said spring retaining means includes a retaining member encircling a substantial portion of said main body portion between said spring and said main body portion and having a plurality of spaced detents integral therewith and extending outwardly therefrom, said detents being helically spaced on said retaining member with one of said detents being disposed adjacent one turn of said helical spring and another of said detents being disposed adjacent another turn of said helical spring, both of said detents being disposed on the respective adjacent turn of said spring forwardly of the rear end of said main body portion, said detents being generally cup-shaped and curved outwardly and upwardly from a first point on said retaining member and in a direction away from the rear end of said main body portion.

5. In a fitting for connecting a rigid duct to a flexible duct wherein said rigid duct includes a front wall having an opening therein, said fitting including a main body portion having a forward end and a rearward end, a flange encircling the forward end of said main body portion and projecting radially outwardly therefrom, the improvement which comprises:

at least one abutment member disposed on said main body portion rearwardly of said flange and spaced therefrom;

generally conically-shaped resilient tensioning means encircling said main body portion and abutting against said abutment member and retained in fixed position on said main body portion projecting radially outwardly therefrom, the narrowest portion of said conically-shaped tensioning means being disposed against said abutment member with the widest portion thereof extending in a direction outwardly from the narrowest portion away from said main body portion, spring retaining means disposed on said main body portion for preventing axial movement of a helical spring in said flexible duct inserted over said main body portion in a direction away from said tensioning means, and said spring retaining means includes a retaining member encircling a substantial portion of said main body portion between said wire and said main body portion and having a plurality of spaced detents integral therewith and extending outwardly therefrom, said detents being helically spaced on said retaining member, said detents being generally cup-shaped and curved outwardly and upwardly from a first point on said retaining member and in a direction away from the rear end of said main body portion.

6. A flow control assembly including the combination of a ventilation duct having an air flow passage therethrough and an opening through the side of said duct communicating with said air flow passage, a pair of spaced tabs formed on the peripheral edge of said opening in the ventilation duct, one of said tabs extending inwardly of said opening and the other of said tabs extending outwardly of said opening;

a fitting having a main body portion with a forward end and a rearward end, a flange encircling the forward end of said main body portion and projecting radially outwardly therefrom, a pair of tabs formed on the leading edge of said flange, one of said flange tabs extending in a direction toward the main body portion and the other of said flange tabs extending in a direction away from said main body portion, a helically extending self-threading member connected at one end to said flange adjacent said flange tabs, said flange being threadably mounted in the opening in said branch-out duct in a fluid-tight manner, said flange being disposed inside of the branch-out duct and behind said opening and said self-threading member cutting into said branch-out duct surrounding said opening, at least one abutment member formed in said main body portion rearwardly of said flange and spaced therefrom, a generally conically-shaped resilient tensioning ring encircling said main body portion abutting against said abutment member and projecting radially outwardly therefrom, the narrowest portion of said conically-shaped ring being disposed against said abutment member with the widest portion thereof extending in a direction outwardly from the narrowest portion thereof away from said main body portion and abutting against said branch-out duct surrounding said opening, and a flexible duct fixedly secured to said main body portion.

7. A flow control assembly for a ventilating system including the combination of a ventilating duct having an air flow passage therethrough and an opening through the side of said duct communicating with said air flow passage, a pair of spaced tabs formed on the peripheral edge of said opening, one of said tabs extending inwardly of said opening and into said passage, the other of said tabs extending outwardly of said opening, a hollow outlet fitting having a main body portion with an air flow passage therethrough and having a forward end and a rearward end, a flange encircling the forward end of said main body portion and projecting radially outwardly therefrom, a pair of tabs formed on the leading edge of said flange, one of said flange tabs extending in a rearward direction toward the main body portion of the fitting and the other of said flange tabs extending in a forward direction away from the main body portion of the fitting, said flange being threaded through the opening and disposed inside of said duct in a fluid-tight manner with the side of said duct surrounding said opening, at least one abutment member formed in said main body portion rearwardly of said flange and spaced therefrom, a generally conically-shaped resilient tensioning ring encircling said main body portion and abutting against said abutment member and projecting radially outwardly therefrom, the narrowest portion of said conically-shaped ring being disposed against said abutment member with the widest portion thereof extending in a direction outwardly from the narrowest portion thereof away from said main body portion and abutting against said branch-out duct surrounding said opening, and a flexible duct fixedly secured to said main body portion.

* * * * *